United States Patent Office 3,157,465
Patented Nov. 17, 1964

3,157,465
PROCESS FOR THE PRODUCTION OF N-ALKALI DIALKALI PHOSPHORAMIDATE
Morris L. Nielsen, Dayton, Ohio, assignor to Monsanto Company, a corporation of Delaware
No Drawing. Filed Dec. 2, 1959, Ser. No. 856,658
2 Claims. (Cl. 23—101)

The present invention relates to a new composiiton of matter and to a process for the manufacture of phosphorus nitrogen compounds such as disodium phosphoramidate, as well as other salts such as dipotassium phosphoramidate and their N-substituted alkali metal derivatives such as N-sodium disodium phosphoramidate.

It is an object of the invention to prepare various alkali metal salts of phosphoramidic acid, which are of utility as corrosion inhibitors and also as intermediates in the preparation of sequestering agents and alkaline builders for detergent compositions.

It is also an object to prepare novel N-substituted alkali metal derivatives of the phosphoramidates. Another object of the invention is to prepare the two said types of compounds in the same process and to control the relative proportions thereof.

The reactants employed in the present invention are phosphoric anhydride, including polymerized forms thereof and an alkali amide such as sodium amide. It has been found that the desired compounds are obtained in high yield when this reaction is carried out at a temperature of from 100° C. to 300° C., or preferably from 100° C. to 250° C. In this temperature range the numerous possible by-products and co-products which are theoretically possible have been found to be minimized.

The phosphoric anhydride and the alkali amide are employed in the general proportion of from 1.5 to 4.5 or preferably 2.0 to 4.0 gram moles of amide per gram atom of phosphorus. A specific preferred example is 3.0 gram moles of amide per gram atom of phosphorus.

The present invention is based upon the reaction of the phosphoric anhydride with alkali amide to yield a mixture of two products. It has also been found that the proportion of the two co-products (e.g., for sodium)

N-sodium disodium phosphoramidate
and
Disodium phosphoramidate can be controlled to yield a preponderance of substantially of one or the other component.

The products thus have the general formula

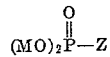

where Z is selected from the group consisting of

—NHLi
—NHNa
—NHK
—NHRb
—NHCs
—NH$_2$ and M is Na, Li, K, Rb or Cs.

The compounds

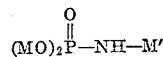

(where M and M' are the same or different members consisting of Na, Li, K, Rb and Cs) are new compounds consisting of Na, Li, K, Rb and Cs) are new compounds existing as high melting white solids which react vigorously with water and moderately with alcohol. These compounds, as exemplified by N-sodium disodium phosphoramidate, are useful as desiccating agents and as intermediates for the manufacture of polymers.

The invention also includes the step of directing the relative proportions of the two coproducts toward high alkali phosphoramidate content by quenching the reaction mixture in a hydroxyl solvent. The term hydroxyl solvent, as employed herein includes water and the alcohols and glycols which boil from 50° C. to 250° C., and also water-alcohol mixtures in all proportions. Other dilute alcohols, e.g., 5 to 95% alcohol with an inert solvent such as benzene may also be employed so as to moderate the reaction and control its endpoint at the desired proportion.

In addition to the use of benzene and other inert solvents mixed with the hydroxyl solvent, other ways of obtaining a mixture of any desired proportion of the two co-products are by regulation of the time and temperature of quenching to control the hydrolysis or alcoholysis of the N-metal form to the amide form. For example, a short time or a low temperature favors a high proportion of the N-metal form. The alcoholysis or hydrolysis may be conducted using a liquid medium or a vapor phase medium such as vaporized alcohol or water. For the preparation of the alkali phosphoramidate, either alcohols or water or mixtures thereof may be employed so that complete conversion of the above N-metal compounds having the radicals —NHLi, —NHNa, —NHK, —NHRb, —NHCs to the —NH$_2$ form results.

The primary reaction between the P$_2$O$_5$ and the alkali amides may be conducted with or without a fluid medium. The solid reactants undergo reaction readily in the absence of a solvent, such as by the use of a low melting flux of sodium and potassium amides. Other salts such as sodium or potassium phenoxide may also be added. Conventional liquid media such as kerosene may also be used.

The following example illustrates a specific embodiment of the invention;

Example 1

A mixture of 1.7 g. phosphorus pentoxide and 5.8 g. sodium amide was stirred as a suspension in kerosene and heated to 205° C. for 15 min. The reaction mixture was then cooled and the kerosene poured off. The solids were flooded with denatured ethanol to destroy unreacted alkali amide and convert the N-sodium disodium phosphoramidate to the disodium phosphoramidate, which was filtered off. Yield 2.95 g., about 45% by weight of disodium phosphoramidate by nuclear magnetic resonance analysis. As a means of purification it was dissolved in water, acidified with acetic acid, and precipitated with methanol to yield the acid salt NaHPO$_3$NH$_2$. This was converted to the disodium phosphoramidate hexahydrate by neutralization in aqueous solution with excess sodium hydroxide and precipitation with ethanol. Yield 1.78 g. (59% theory). To prepare the anhydrous disodium phosphoramidate the hexahydrate was dehydrated at less than 15 mm. pressure at temperatures of 60–110° C.

Example 2

The preparation of N-sodium disodium phosphoramidate was conducted by using a mixture of 2 g. P$_2$O$_5$ and 10 g. potassium amide in kerosene. After heating to 205° C. for 15 min., the reaction mixture was cooled, the kerosene was removed by a benzene wash, and finally the unreacted sodium amide was removed by solvent extraction using liquid ammonia. The N-sodium disodium phosphoramidate was recovered as a finely divided solid.

What is claimed is:

1. Process for the production of N-alkali dialkali phosphoramidate selected from the group in which the alkali is sodium, lithium, potassium, rubidium and cesium which comprises heating together a mixture of an alkali amide selected from the group in which the alkali is sodium, lithium, potassium, rubidium and cesium and phosphoric anhydride, the proportion of the amide being from 1.5 to 4.5 gram moles per gram atom of phosphorus, at a temperature of 100 to 300° C.

2. Process for the production of disodium phosphoramidate which comprises heating together a mixture of sodium amide and phosphoric anhydride, the proportion of the amide being three gram moles per gram atom of phosphorus, at a temperature of 100 to 300° C. to obtain a mixture of disodium phosphoramidate and N-sodium disodium phosphoramidate and continuing the said heating to transform the said N-sodium disodium phosphoramidate which is present to disodium phosphoramidate by quenching the said reaction mixture in a hydroxyl solvent selected from the group consisting of water and the alcohols and glycols which boil from 50° C. to 250° C. whereby alcoholysis of the N-alkali metal bond takes place.

References Cited in the file of this patent

Mellor: "Comprehensive Treatise on Inorganic and Theoretical Chemistry," vol. 8, pages 257 and 258, Longmans, Green and Company.